UNITED STATES PATENT OFFICE.

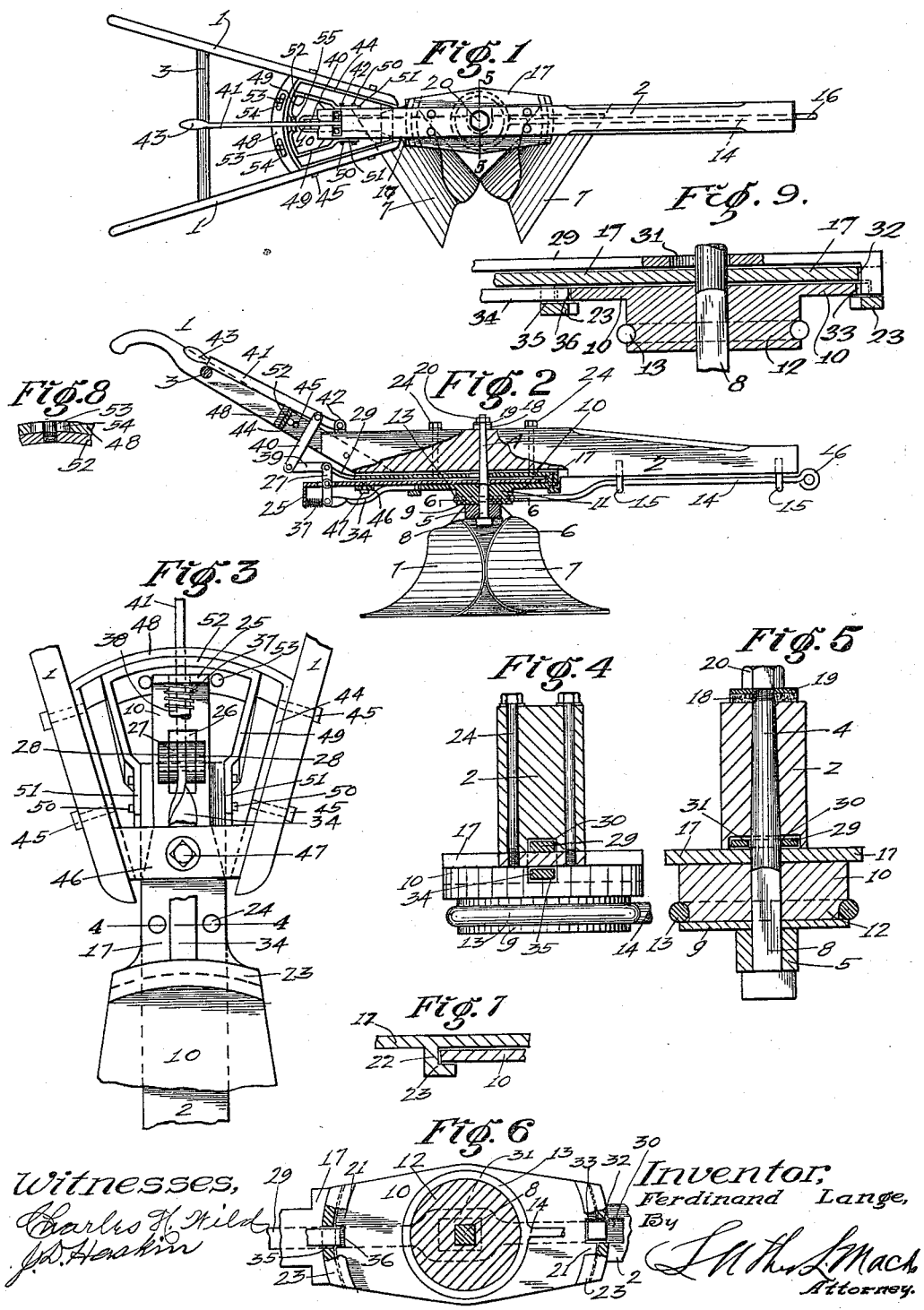

FERDINAND LANGE, OF LOS ANGELES, CALIFORNIA.

REVERSIBLE PLOW.

1,151,198.  Specification of Letters Patent.  Patented Aug. 24, 1915.

Application filed July 14, 1914. Serial No. 852,105.

*To all whom it may concern:*

Be it known that I, FERDINAND LANGE, a citizen of the United States, residing at Los Angeles, in the county of Los Angeles and State of California, have invented a new and useful Reversible Plow, of which the following is a specification.

My invention relates to plows and has for its object, the provision of means whereby the beam and handle of the plow may be reversed at the end of a furrow without turning the share; the provision of a pair of similar and oppositely mounted shares; and means for pivotally securing the handle of the plow to the beam in order that a slight lateral movement of the handles may be had to enable the plowman to walk in the furrow rather than on the ground adjacent to the furrow as is necessary in the use of other types of plows.

A further object of my invention is to provide means for hitching a team of horses or an engine directly to the share mounting instead of the beam, in order that the pull may be centralized on the shares and less effort on the part of the plowman will be required to keep the plow in the furrow.

Other objects may appear in the subjoined detailed description of my invention as illustrated in the accompanying drawings in which, Figure 1 is a plan; Fig. 2 is an elevation, partly broken away on the lateral center line of the beam; Fig. 3 is a fragmentary bottom view of the beam showing the pivotal connection of the handle; Fig. 4 is a cross section of the beam on the line 4—4 of Fig. 3; Fig. 5 is a cross section of the beam and swivel plates on the line 5—5 of Fig. 1; Fig. 6 is a horizontal section of the swivel hub and a bottom view of the swivel plates, partly broken away; Fig. 7 is a fragmentary section of Fig. 6 on the line 7—7; Fig. 8 is a fragmentary section of the handle sector showing the limiting pins and slots, and Fig. 9 is a central longitudinal section of Fig. 6.

Similar characters of reference indicate the same parts throughout the specifications and the several views of the drawings.

My plow has the handles 1 and the beam 2 of the conventional type, the handles being connected near the outer end with the lateral member 3, and the beam 2 being provided near its center with the king bolt 4 which passes through a lug 5 on a suitable mounting 6 beneath the beam to which the pair of shares 7 is suitably secured. The lower portion 8 of the bolt 4 is squared and on this squared portion immediately above the lug 5 is a retaining plate 9 and above the plate 9 is the swivel plate 10 having the hub 11, the lower portion 12 of the hub being slightly reduced to provide a seat for a loop 13 of a draft rod 14 which extends through the eyes or staples 15 beneath the beam 2 to the front end and is provided with an eye 16 at the extreme end for hitching a team of horses or a motor to the plow.

The upper portion of the bolt is round and passes through a stationary plate 17 secured to the beam 2 and through the beam, and is held in position by means of a leather washer 18, a metal washer 19 and a nut 20 at the top of the beam, thus the plate 17 and the beam 2 to which the plate is secured are free to turn on the bolt, while the plates 9 and 10 and the share mounting 6 being provided with square holes to receive the lower portion of the bolt may be held stationary while the beam is turned, as hereinafter described.

The swivel plate 10 has the outwardly extending concentrically curved ends 21 which are adapted to engage the recesses 22 formed in the similarly curved downward extensions 23 on the stationary plate 17 which is secured to the lower side of the beam 2 by means of the cap screws 24 and one end of which is elongated toward the handles 1 and at the extreme end has a downwardly extending lug 25. The plate 17, near the lug 25 has a slot 26 in which is mounted a vertically disposed lever 27 which is pivoted on the lugs 28, and to this lever is pivoted at its upper end an arm 29 adapted to slide in a suitable groove 30 in the bottom of the beam 2, the central portion of the arm being provided with a slot 31 around the king bolt 4 and the other end being bent downwardly and adapted to seat in a notch 32 in the plate 17 and also in a notch 33 in the plate 10. The lower end of the lever 27 is pivotally connected to an arm 34 which is slidably seated in a notch 35 in the plate 17 and adapted to engage the notch 36 in the end of the plate 10, the purpose of the arms 29 and 34 being to engage the notches 33 and 36 in the plate 10 when the shares 7 and the beam 2 are in their normal relation, and to disengage said notches when it is desired to turn the beam on the share mounting.

A spring 37 is mounted on a pin 38 in the lug 25 of the plate 17 which is adapted to compress between the lower end of the lever 27 and the lug 25 and thus hold the arms 29 and 34 in engagement normally with the notches 33 and 36 in the plate 17, and the upper end of the lever 27 has a horizontal arm 39 which is pivoted to one end of a link 40 whose other end is pivoted to the lower end of a hand lever 41 which is pivotally mounted in a bracket 42 secured to the top of the beam 2, and the handle 43 of which extends upwardly and backwardly to a position convenient to the plowman.

The lower ends of the handles 1 are braced and held rigidly together by a sector member 44 secured to the handles by means of the bolts or screws 45, having the lower flat section 46 adapted to be pivotally connected to the plate 17 by a cap screw 47, and having the central portion 48 whose curve is concentric with the pivot screw. A somewhat similar member 49 is secured to the beam 2 by means of the bolts 50 through the ends 51 and its curved portion 52 is adapted to conform to the curve of the outer member and slidably engage it, the pins 53 in the curved portion 52 being adapted to engage the slots 54 in the curved portion 48 of the outer member for limiting the movement thereof. I provide a lug 55 on the curved portion 52 of the inner member 49 which is provided with a slot adapted to receive the hand lever 41 and prevent a lateral movement of the lever.

In operation, when the end of a furrow has been reached, the handle 43 of the hand lever 41 may be raised, when the upper end of the lever 27 will move inwardly and the lower end of this lever will move outwardly against the tension of the spring 37, and the arms 29 and 34 will be caused to slide in their grooves and to disengage the notches 33 and 36, respectively. The entire upper structure of the plow may then be turned a half of a revolution on the king bolt 4, when, as soon as the hand lever has been released, the tension of the spring will cause the restoration of the arms 29 and 34 and they will assume their normal position in the notches 33 and 36 of the plate 10, and the plow will be ready for operation in the reverse direction.

The pivotal connection between the handles 1 and the beam 2 enables the plowman to draw the handles slightly to one side or the other and walk in the furrow instead of on the ground adjacent to the furrow, the ground often being covered with stubble and rendering the control of the plow extremely difficult at times.

The spring 37 for restoring the levers may be placed at any convenient point about the levers instead of as shown, and the shares 7 may be mounted on any type of support, and in other respects, the structure of my device may be changed in many particulars without departing from the spirit of my invention and without limiting its scope.

Having thus described my invention what I claim is:

1. A reversible plow having a stationary plate on the beam provided with recessed extensions and a plate secured to the share mounting in pivotal contact therewith the ends of which engage the recesses in said extensions, and means operable from the handles for locking said plates together for fixing the relationship of the beam and shares.

2. A reversible plow comprising a beam and shares provided with pivotally contacting plates having a common axis, there being recessed extensions on one of the plates engaged by the ends of the other plate, and means operable from the handles for locking the plates together and thus fixing the relationship of the beam and shares.

3. A plow comprising a beam and shares in reversible relationship, pivotally contacting plates secured to said beam and said shares in pivotal relationship and having a common axis, a bar slidably mounted above the uppermost of said plates the forward end of which is adapted to extend through said upper plate and to engage a notch in the lower plate at the forward end thereof, a bar parallel to said first named bar and adapted to engage a similar notch in the opposite end of said lower plate, and lever means operable from said handles and connected with said bars for locking said plates together and fixing the relationship of said beam and shares.

4. A plow having a beam and shares in reversible relation and provided with pivotally contacting plates and having a common axis, parallel bars slidable on said plates and adapted to engage and lock opposite ends thereof, and lever means operable from the handles and connected to said bars for locking and unlocking said plates when reversing said plow.

5. In a reversible plow, the combination with a beam and shares reversible thereon, of pivotally contacting plates on said beam and shares, parallel bars slidable on and adapted to lock both ends of said plates together, lever means connected with said bars and operable from the handles, and means adjacent to the handles for locking said lever means against movement when said plates are locked together.

FERDINAND LANGE.

Witnesses:
ANNE HARTENSTEIN,
CHARLES H. WILD.